July 4, 1950     H. ABRAHAM     2,514,021
COMPOSITION BOARD
Filed March 13, 1948

INVENTOR.
HERBERT ABRAHAM
BY
ATTORNEY

Patented July 4, 1950

2,514,021

UNITED STATES PATENT OFFICE 2,514,021

COMPOSITION BOARD

Herbert Abraham, New York, N. Y., assignor to The Ruberoid Co., New York, N. Y., a corporation of New Jersey Application March 13, 1948, Serial No. 14,701

5 Claims. (Cl. 106—93)

This invention relates to improvements in a composition board, and more particularly to a fibro-cement board containing organic matter.

Various proposals have been made to manufacture composition fibro-cement boards from mixtures of hydraulic cement and organic fibers, with or without the addition of asbestos fibers. The fibro-cement boards heretofore made, containing organic fibers, have been commercially unsatisfactory principally because of the fact that they warp excessively, absorbing moisture to a relatively high degree.

I have found that these objections can be overcome, and that a fibro-cement board which is highly resistant to warping can be successfully and economically manufactured with use of sulfate cellulose fibers and asphalt, or like bituminous waterproofing agent, as the organic constituents. Sulfate cellulose fibers may be obtained inexpensively from waste kraft paper products. They are relatively long, strong, and have other desirable properties that make them especially suitable for the manufacture of fibro-cement board.

The principal object of this invention is to provide a composition board that is substantially non-warping.

Another object is to provide a composition board that when exposed to flame will not support combustion.

A further object is to provide a composition board that is moisture and weather resistant.

Still further objects are to provide composition boards of great mechanical strength having a high modulus of rupture, that are relatively inexpensive to manufacture, and that can be easily cut, sawed, nailed, and otherwise worked in the manner of lumber.

According to this invention, the board is made from a pulp or slurry containing portland cement, asbestos fiber, sulfate cellulose fiber, and asphalt, in suitable proportions. If desired, pulverized limestone, clay, or like inorganic fillers may be added. The product may be made on a so-called wet machine by the well known Hatschek process, or on a vacuum suction filter, such as an Oliver filter, or in any other suitable manner.

Inclusion of asphalt in the mixture gives the board a somewhat dark color, and therefore for decorative purposes it is desirable to face one or both surfaces with a veneer of asbestos-cement composition. For some purposes, however, the product may be used without a surface veneer.

Figure 1:
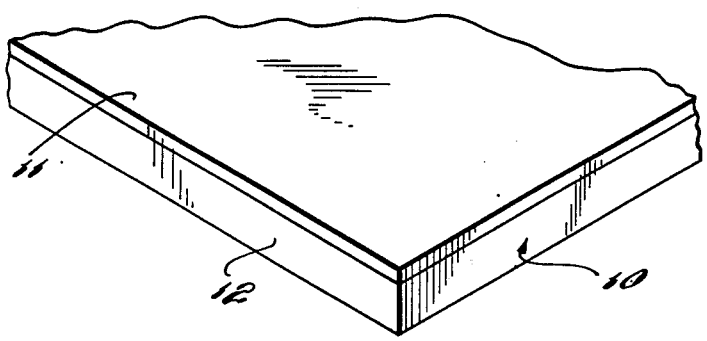
Fig. 1 is a fragmentary perspective view of the composition board having a veneer of asbestos-cement on one surface.
Figure 2:
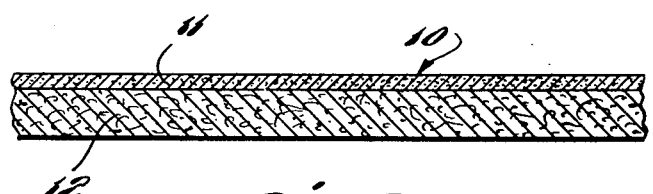
Fig. 2 is a cross-sectional view thereof.
Figure 3:
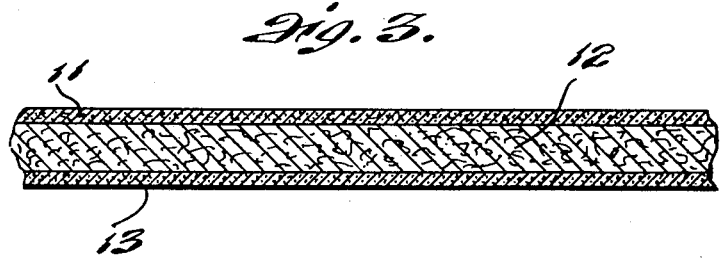
Fig. 3 is a similar cross-sectional view of a composition board faced on both surfaces with asbestos-cement veneer.

In the forms of the invention illustrated in the drawings, 10 indicates the board in general, 11 represents the veneer on the upper surface, 12 is the core or board proper, and 13, in Fig. 3, is the veneer on the lower surface.

The core 12 comprises both inorganic and organic matter of which the inorganic components are Portland cement, or other suitable hydraulic cement, asbestos fiber, and if desired inorganic fillers such as limestone, clay, or the like, and the organic components are sulfate cellulose fiber, and asphalt or like bituminous waterproofing agent. The two classes of matter are used in substantially the proportion by weight of about 85–90% inorganic matter and about 10–15% organic matter.

The following is a typical example of the solid ingredients of one composition that has given the best results, the parts of which, however, are subject to variation within the limits stated:

| | Percent |
|---|---|
| Portland cement | 86.5 |
| Asbestos fiber (7D grade) | 3.5 |
| Sulfate cellulose fiber | 7.0 |
| Asphalt | 3.0 |
| | 100.0 |

Boards made substantially according to the above formula were subjected to weathering tests without exhibiting any appreciable warping or shrinking. On exposure to flame it was found that while they will carbonize and give off vapor, they will not ignite. Samples of such board were subjected to a flame temperature of about 1750° F. without igniting and with no appreciable bleeding of the asphalt. The boards have a relatively high mechanical strength, and a low percentage of water absorption. Specimens tested were found to have a modulus of rupture of from 2600–2900 pounds per square inch, and when tested after immersion in water for about twenty-four hours were found to have absorbed on the average only about 15% by weight of water.

In order that the board should not support combustion it is necessary that the amount of sulfate cellulose fiber and asphalt present in the composition, taken together, shall not exceed about 15% of the total weight of all of the ingredients. The asphalt serves to waterproof the sulfate cellulose fibers, and is preferably used in the form of an emulsion in which case the percentage by weight of the asphalt given in the above formula is based on the dry weight of asphalt contained in the emulsion. While use of an emulsion is preferred for convenience, the asphalt may be used in any other form. For example, it may be incorporated in the mix in powdered form, in which event the finished board after the cement has set must be heated to flux the asphalt.

The ratio of asphalt to sulfate cellulose as set forth in the above formula, wherein these ingredients constitute 10% of the whole, is approximately 1 to 2 plus. However, the relative proportion of those ingredients may be varied within the total upper limit of 15% depending, among other factors upon whether greater waterproofing or greater strength of the finished product is desired. In general, the amount of asphalt should not exceed about 5% and the amount of sulfate cellulose fiber not over about 10%, both by weight, of the entire composition.

The asbestos fibers used in the core mix, for the sake of economy, are preferably of short length, such as are commercially known as "7D-grade." The amount of asbestos fiber in the composition may be varied as desired in accordance with the common practice in the composition board art. A satisfactory board of adequate strength can be made with a low percentage of short asbestos fibers because of the fact the board is additionally reinforced by the cellulose sulfate fibers.

The veneers 11 and 13 are each made of a composition having about 76%–83% by weight of Portland cement and about 17%–24% by weight of asbestos fibers. The fibers of the veneer are preferably relatively long asbestos fibers of the class known as "5-grade." No asphalt or sulfate cellulose fibers are present in the veneer.

Where the product is made on a wet-machine, the veneer 11 will constitute the first felted layer wound on the accumulator roll or drum of the machine, and the veneer 13 the last felted layer to be wound thereon.

What I claim is:

1. A composition board of the character described, comprising a sheet of set hydraulic cement containing about 10% by weight of sulfate cellulose fibers, and about 5% by weight of bituminous waterproofing substance.

2. A composition board of the character described, comprising a sheet of set hydraulic cement containing from about 7–10% by weight of sulfate cellulose fibers, and from about 3–5% by weight of a bituminous waterproofing agent.

3. A composition board of the character described, comprising inorganic and organic constituents in substantially the following percentages by weight: inorganic constituents, set Portland cement reinforced with asbestos fibers, about 85–90%; organic constituents, sulfate cellulose fibers 7–10% and asphalt 3%.

4. A composition board as described in claim 3, in which the sulfate cellulose fibers and asphalt are present in the ratio of one part of asphalt to from about 2–3 parts of cellulose fibers.

5. A composition board of the character described, comprising a set cement sheet composed of the following constituents in substantially the percentages by dry weight set forth: Portland cement 86.5%, asbestos fibers 3.5%, sulfate cellulose fibers 7%, and asphalt 3%.

HERBERT ABRAHAM.

REFERENCES CITED

The following references are of record in the file of this patent:

UNITED STATES PATENTS

| Number | Name | Date |
|---|---|---|
| 2,122,192 | Batcheller | June 28, 1938 |
| 2,156,311 | Schuh | May 2, 1939 |
| 2,235,176 | Schless | Mar. 18, 1941 |
| 2,421,721 | Smith | June 3, 1947 |